United States Patent [19]
Bray

[11] Patent Number: 5,893,173
[45] Date of Patent: Apr. 13, 1999

[54] METHOD AND APPARATUS FOR SECURING AN ARTICLE OF CLOTHING TO AN ANIMAL

[76] Inventor: Irene F. Bray, 951 Canyon View, Unit 303, Sagamore Hills, Ohio 44067

[21] Appl. No.: 08/880,946

[22] Filed: Jun. 23, 1997

Related U.S. Application Data

[60] Provisional application No. 60/020,388, Jun. 25, 1996.

[51] Int. Cl.[6] .................................................. A42B 19/02
[52] U.S. Cl. .................................. 2/171; 2/175.4; 2/183; 119/850
[58] Field of Search .................... 2/171, 175.4, 195.5, 2/171.02, 171.03, 171.04, 183, 200.3; 119/814, 837, 850

[56] References Cited

U.S. PATENT DOCUMENTS

| | | | |
|---|---|---|---|
| 1,880,819 | 10/1932 | Collins | 2/171.02 |
| 2,623,213 | 12/1952 | Provitola et al. | 2/171.03 |
| 2,673,350 | 3/1954 | Chuck | 2/171.03 |
| 3,008,145 | 11/1961 | Austin et al. | 2/183 |
| 3,020,555 | 2/1962 | Taylor | 2/171.03 |
| 3,234,563 | 2/1966 | Tabbat | 2/171 |
| 5,603,121 | 2/1997 | Borkovic et al. | 2/183 |

*Primary Examiner*—Gloria M. Hale
*Attorney, Agent, or Firm*—Fay, Sharpe, Beall, Fagan, Minnich & McKee

[57] ABSTRACT

An animal hat and a method for securing an animal hat to an animal is disclosed. The animal hat includes an outer shell, an inner band secured to the outer shell, a plurality of apertures extending through the inner band, and a harness joined to the inner band. The harness includes an elongate strap threaded through the apertures to form a first loop, a second loop, and a third loop wherein the first loop is positioned under a muzzle of the animal and free ends of the strap pass behind the animal's ears and are secured together under the muzzle. A ring joins the second and third loops together within the outer shell. The ring adds elasticity to the strap to make the harness more comfortable for the dog to wear.

19 Claims, 4 Drawing Sheets

5,893,173

METHOD AND APPARATUS FOR SECURING AN ARTICLE OF CLOTHING TO AN ANIMAL

CROSS REFERENCE TO RELATED APPLICATIONS

This application claims the benefit of U.S. Provisional Patent Application No. 60/020,388, filed Jun. 25, 1996.

BACKGROUND OF THE INVENTION

The present invention relates to the art of securing an article of clothing to an animal. It finds particular application in conjunction with securing a hat to the head of a dog, and will be described with particular reference thereto. However, it should be appreciated that the present invention may also find application in conjunction with other methods and devices for securing protective and fanciful articles of clothing to dogs and other animals.

It is known that dog owners occasionally cloth their pets with various articles. It is desirable for an article to remain secured to the animal regardless of the animal's activities (e.g., running, jumping, rolling-over, laying down, sitting, etc.). With certain articles, security is not an issue. For instance, a dog sweater may include a central portion which secures around the dog's body, and/or one or more leg openings for receiving the dog's legs therein. In addition, a bandana may be secured around a dog's neck by simply tying the ends of the bandana together. However, securing a hat to a dog's head has, heretofore, not been easily accomplished.

With any method of securing an article to an animal, an important issue is the comfort of the animal. In particular, most dogs will not tolerate a hat secured to their head if the securing means interferes with the dog's movement or interferes with any part of the dog's body, such as the dog's ears.

Accordingly, it has been considered desirable to develop a new and improved article and method for securing the article to an animal which meets the above-stated needs and overcomes the foregoing difficulties and others while providing better and more advantageous results.

SUMMARY OF THE INVENTION

In accordance with one aspect of the present invention, a hat for an animal is disclosed. The hat includes an outer shell, an inner band secured to the outer shell, and a plurality of apertures extending through the inner band. A strap is threaded through the apertures to form a first loop, a second loop, and a third loop wherein the first loop is positioned under a muzzle of the animal and free ends of the strap pass behind the animal's ears and are secured together under the muzzle. A ring joins the second and third loops together within the outer shell.

In accordance with another aspect of the present invention, a method of securing a hat to an animal is disclosed wherein the hat has an outer shell, an inner band secured to the outer shell, and a plurality of apertures extending through the inner band. The method includes threading a strap through a first aperture and a second aperture to form a first loop, threading the strap through a third aperture to form a second loop, threading the strap through a fourth aperture to form a third loop, positioning the second loop under a muzzle of the animal, passing free ends of the strap behind the animal's ears, and securing the free ends together under the muzzle.

One advantage of the present invention is the provision of an article which secures easily to an animal.

Another advantage of the present invention is the provision of an article which secures quickly to an animal.

Yet another advantage of the present invention is the provision of an article for securing to an animal which does not interfere with the animal or with the animal's movement.

A further advantage of the present invention is the provision of a method for easily securing an article to an animal.

A still further advantage of the present invention is the provision of a method for quickly securing an article to an animal.

Yet a further advantage of the present invention is the provision of a method for securing an article to an animal which does not interfere with the animal or with the animal's movement.

Additional advantages of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating a preferred embodiment and are not to be construed as limiting the invention.

DETAILED DESCRIPTION OF THE PREFERRED EMBODIMENTS

Figure 1:
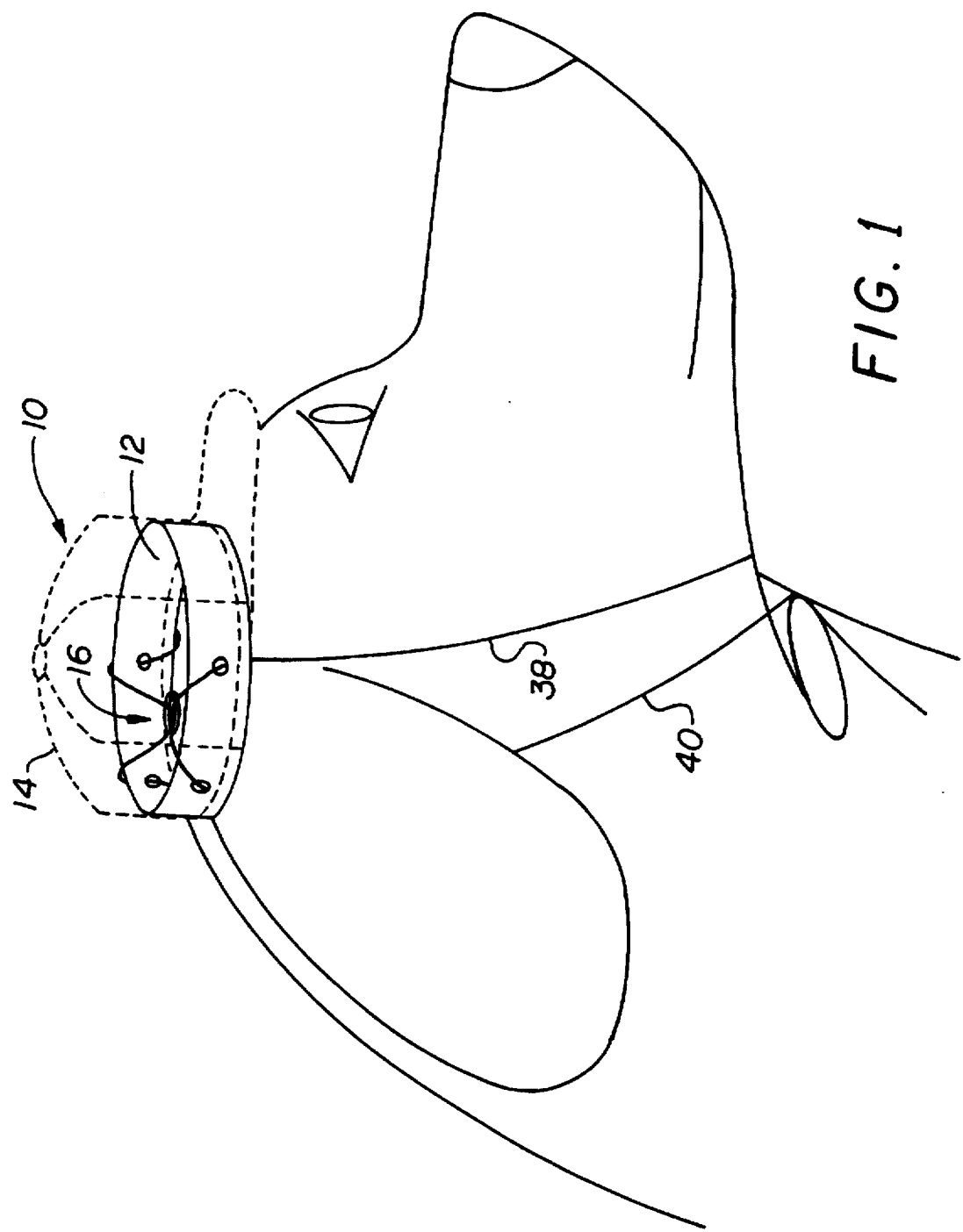
FIG. 1 is a side view of a dog having a hat secured thereto in accordance with a first embodiment of the present invention.

With reference to FIG. 1, an animal such as a dog, has an article, and more particularly, a hat 10 secured on top of its head in accordance with a first embodiment of the present invention.

Figure 2:
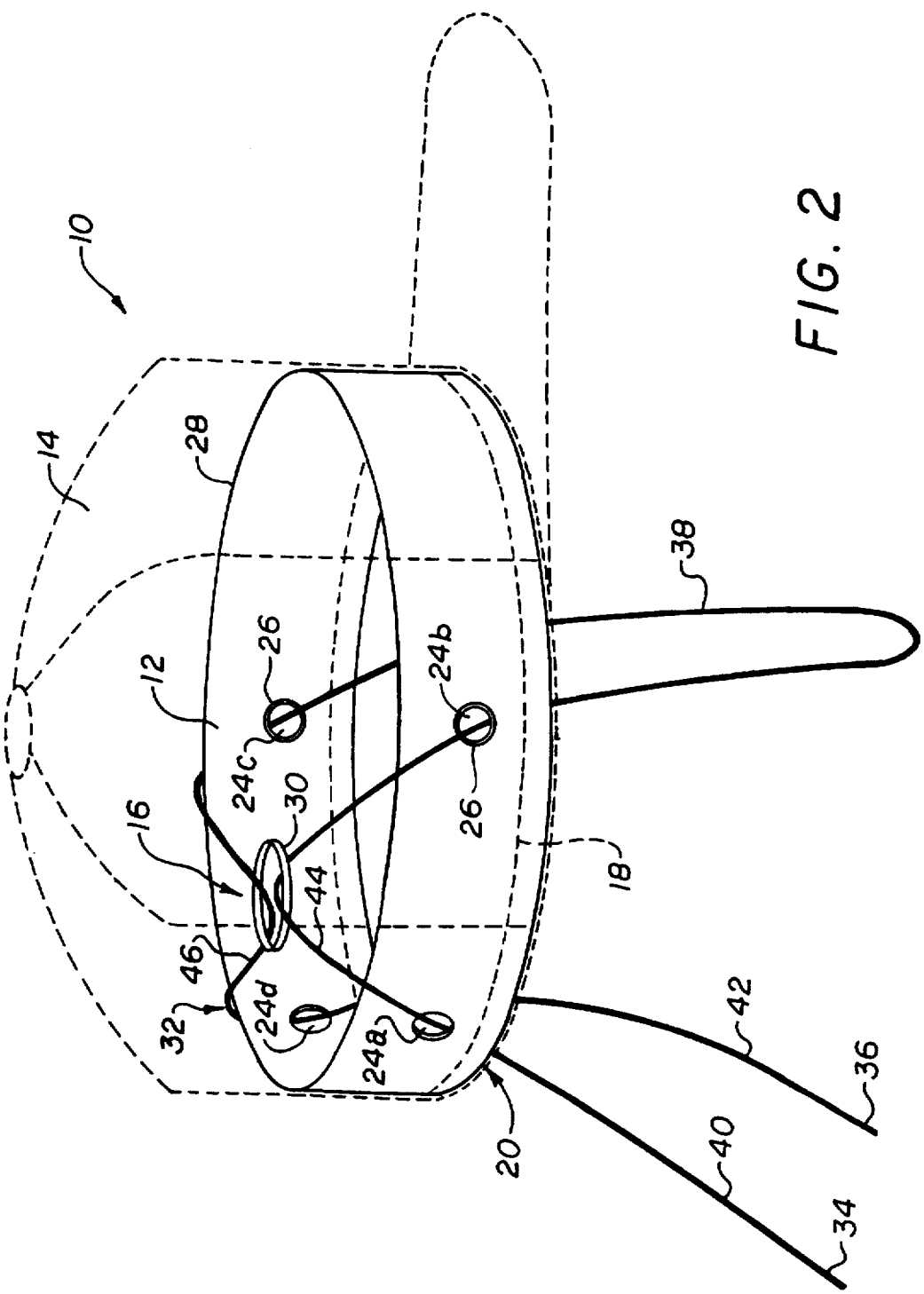
FIG. 2 is an enlarged perspective side view of the hat of FIG. 1.
Figure 3:
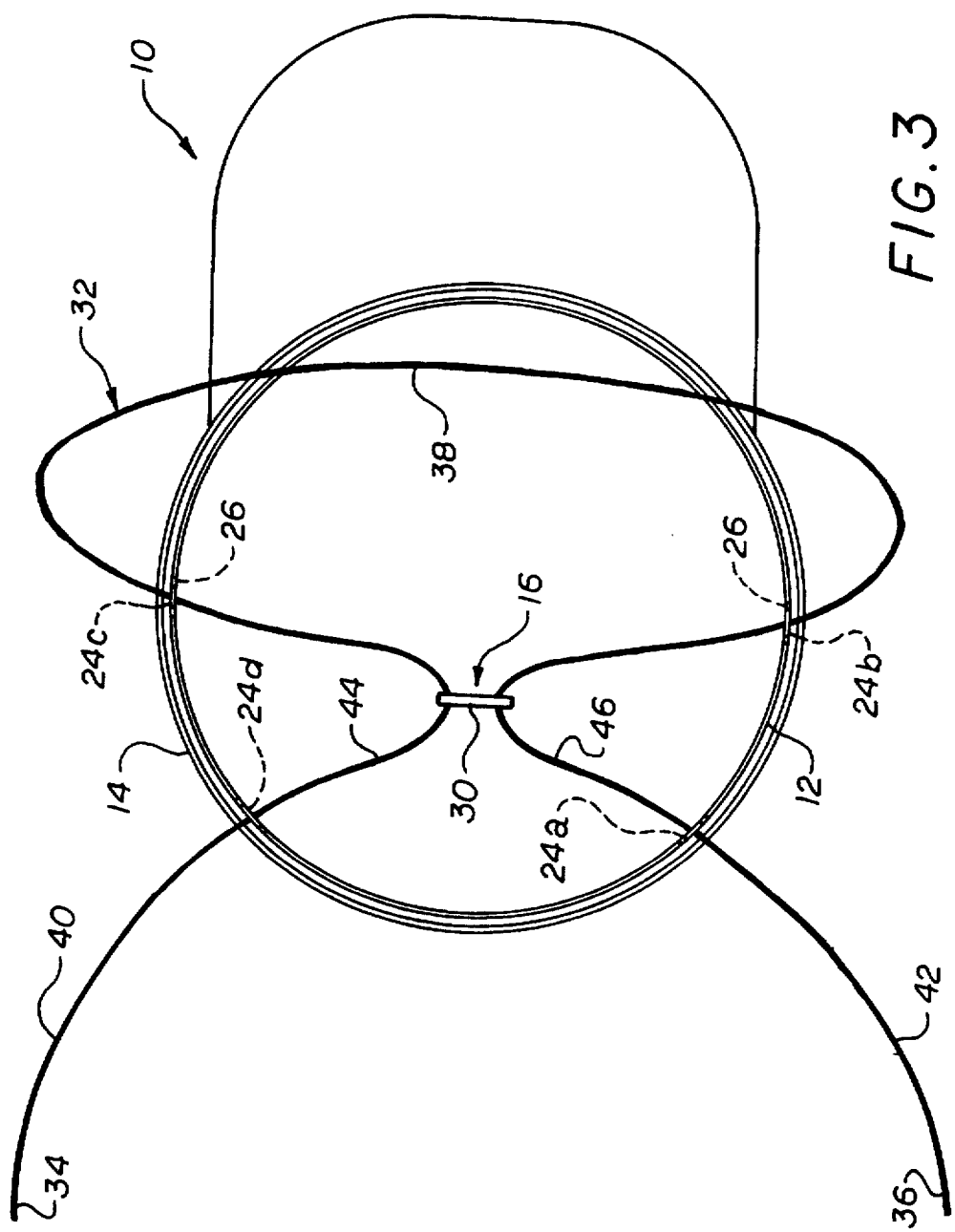
FIG. 3 is a bottom plan view of the hat of FIG. 1.

With continuing reference to FIG. 1, and particular reference to FIGS. 2 and 3, the hat 10 includes an inner band 12, an outer shell 14 (shown in phantom), and a securing means 16. The inner band 12 is secured to the outer shell 14 with one or more rows of stitching 18 along lower end edges 20 of the band 12 and outer shell 14. It should be appreciated that the inner band 12 may be secured to different types of outer shells 14. For instance, the outer shell 14 may be in the form of a baseball hat (as shown in FIGS. 1–4), a mortar board, cowboy hat, chef's hat, tiara, firemen's hat, beach hat, visor, top hat, sailor's hat, touring cap, fishermen's hat, Santa's hat, Robin Hood's hat, Maid Marion's hat, Sherlock Holmes' hat, etc.

A plurality of circumferentially spaced-apart apertures 24 extend through a side wall defining the band 12. The apertures 24 may be reinforced with stitching or with grommets 26. The band 12 may form a continuous closed-loop around the inner periphery of the outer shell 14. Alternatively, the band 12 may form an open-loop to accommodate a conventional hat size adjuster (not shown) positioned at a rear portion of the hat 10.

In the embodiment being described, the band 12 is formed from interfacing. However, the band 12 may be formed from any material such as cloth, plastic, cardboard, etc. The stiffness of the interfacing may be adjusted by folding or creasing the interfacing one or more times to form a plurality of like-oriented side walls overlaying one another. A crease 28 forms an upper end edge of the band 12. The upper end edge 28 may be pulled inward away from the outer shell 14 to facilitate joining the securing means 16 to the hat 10 as described further below.

The securing means 16 includes a ring 30 and an elongate strap 32 having a first end 34 and a second end 36. The ring 30 is positioned within or under the outer shell 14, and is preferably formed from a resilient material such as an elastomeric gasket, O-ring, rubber band, etc. The strap 32 may be formed from any material such as a Grosgrain ribbon, a nylon web, a shoe string, etc.

The strap 32, when laced or otherwise threaded though the ring 30 and the apertures 24, forms a harness for securing the hat 10 to the head of the animal. As best seen in FIG. 2, the harness is formed by threading the first end 34 of the strap up through a rear aperture 24a. The first end 34 is then threaded through the ring 30 and back down through a front aperture 24b positioned on the same side of the band as the aperture 24a. The first end 34 is then threaded up through a front aperture 24c opposite aperture 24b. The first end 34 is then threaded back through the ring 30 and then down through a rear aperture 24d positioned on the same side of the band as aperture 24c. It should be appreciated that the strap 32 may also be threaded by starting at aperture 24d instead of aperture 24a.

When threaded as described above, a first loop 38 is formed by the strap portion extending directly between the front apertures 24b, 24c. When the hat is placed on a dog, the loop 38 is placed under the dog's muzzle and in front of the dog's ears. After any excess slack has been taken up in the loop 38, the strap portions 40, 42 extending down from the rear apertures 24a, 24d are then placed behind or under the dog's ears so that the free ends 34, 36 may be joined together under the dog's muzzle in any conventional manner, such as by tying the free ends into a bowknot, using a buckle, using a slide device typically associated with a bolo tie, etc.

When the hat 10 is secured in the manner described above, the ring 30 adds elasticity to the strap 32 to make the harness more comfortable for the dog to wear. The color of the strap 32 could match the color of the dog so that the hat 10 looks as though it is merely sitting on top of the dog's head.

In the embodiment being described, the band 12 has four (4) apertures 24 extending therethrough. However, the number of apertures may be increased to facilitate repositioning the strap 32 relative to the band 12 to accommodate dogs of different sizes. In addition, additional apertures permit the hat to be oriented in different directions on the dog's head.

It should be appreciated that the strap 32 could be threaded through the apertures 24a–24d without the presence of the ring 30. The strap 32 thus forms the first loop 38 between apertures 24b and 24c, forms a second loop 44 (FIG. 3) between apertures 24a and 24b, and forms a third loop 46 between apertures 24c and 24d. The second and third loops 44, 46 may then be joined together with a closable, preferably resilient, ring to form the harness.

Figure 4:
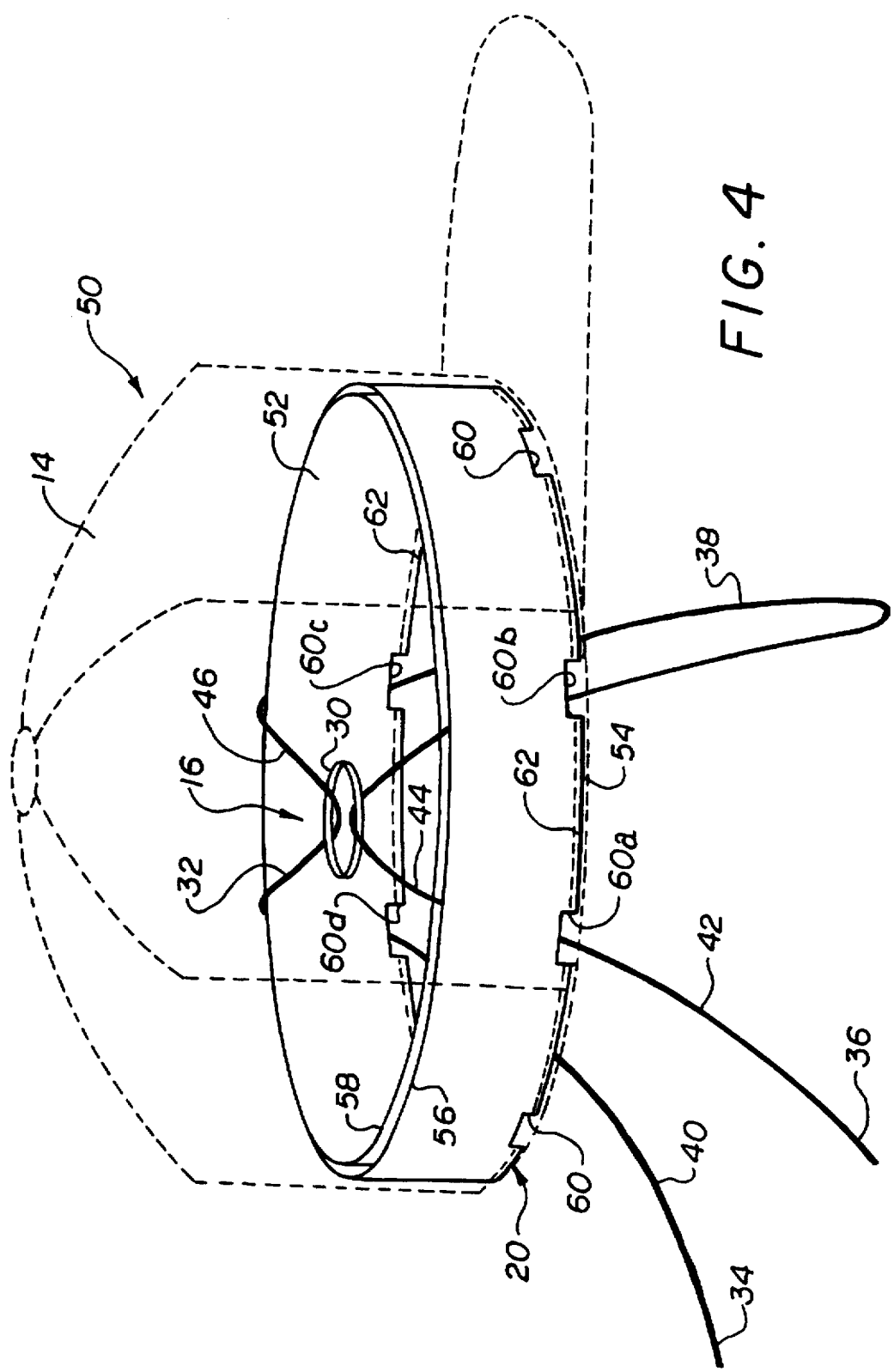
FIG. 4 is an enlarged perspective side view of a hat in accordance with a second embodiment of the present invention.

Referring now to FIG. 4, a hat 50 in accordance with a second embodiment of the present invention is shown. To facilitate a description of the hat 50, the same reference numerals are used to identify elements in common with the hat 10 of FIGS. 1–3. The hat 50 includes an inner band 52, the outer shell 14 (shown in phantom), and the securing means 16. In the embodiment being described, the band 52 is formed from interfacing material. However, the band 52 may be formed from other materials such as cloth, plastic, cardboard, etc. The band 52 may form a continuous closed-loop around the inner periphery of the outer shell 14. Alternatively, the band 12 may form an open-loop to accommodate a conventional hat size adjuster (not shown) positioned at a rear portion of the hat 50.

In the embodiment being described, the band 52 is folded in half lengthwise to form a V-shaped band. A crease 54 forms a lower edge of the band. Two side walls 56, 58 form an upper portion of the band. A series of circumferentially spaced-apart notches 60 extend around the crease 54. The notches 60 may be reinforced with stitching is desired. The inner band 52 is secured to the outer shell 14 with one or more rows of stitching 62 along crease 54 between the notches 60. As with the first embodiment, the inner band 52 may be secured to different types of outer shells 14.

The strap 32, when laced or otherwise threaded though the ring 30 and the notches 60, forms a harness for securing the hat 50 to the head of the animal. The harness is formed by threading the first end 34 of the strap up through a rear notch 60a between the side walls 56, 58. The first end 34 is then threaded through the ring 30 and back down through the side walls 56, 58 and through a front notch 60b positioned on the same side of the band as the notch 60a. The first end 34 is again threaded between the side walls 56, 58 through a front notch 60c opposite to notch 60b. The first end 34 is again threaded through the ring 30 and then back down through the side walls 56, 58 and through a rear notch 60d positioned on the same side of the band as the notch 60c. It should be appreciated that the strap 32 may also be threaded by starting at the notch 60d instead of the notch 60a.

When threaded as described above, the loop 38 is formed by the strap portion extending directly between the front notches 60b, 60c. When the hat is placed on a dog, the loop 38 is placed under the dog's muzzle and in front of the dog's ears. After any excess slack has been taken up in the loop 38, the strap portions 40, 42 extending down from the rear notches 60a, 60d are then placed behind or under the dog's ears so that the free ends 34, 36 may be joined together under the dog's muzzle in any conventional manner, such as by tying the free ends into a bowknot, using a buckle, using a slide device typically associated with a bolo tie, etc.

In the embodiment being described, the band 52 has eight (8) notches 60 (six of which are shown) extending therethrough. It should be appreciated that the strap 32 may be threaded through any combination of the eight notches to accommodate dogs of different sizes, and to permit the hat to be oriented in different directions on the dog's head.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiment, the invention is now claimed to be:

1. A hat for an animal, comprising:
   an outer shell;
   an inner band secured to the outer shell;
   a plurality of apertures extending through the inner band;
   a strap threaded through the apertures to form a first loop, a second loop, and a third loop wherein the first loop is positioned under a muzzle of the animal and free ends of the strap pass behind the animal's ears and are secured together under the muzzle; and a ring joining the second and third loops together within the outer shell.

2. The animal hat of claim 1, further including a grommet surrounding each of the plurality of apertures.

3. The animal hat of claim 1, wherein the ring is formed from a resilient material.

4. The animal hat of claim 1, wherein the ring is a closed ring.

5. The animal hat of claim 1, wherein the ring is a closable ring.

6. The animal hat of claim 1, wherein the inner band is formed from interfacing material.

7. The animal hat of claim 1, wherein the inner band is folded in half lengthwise to form a crease with first and second side walls extending from the crease.

8. The animal hat of claim 7, wherein the apertures are defined as notches through the crease.

9. The animal hat of claim 1, wherein the strap is formed from Grosgrain ribbon.

10. The animal hat of claim 1, wherein the outer shell is in the shape of one of a baseball hat, a mortar board, a cowboy hat, a chef's hat, a tiara, a firemen's hat, a beach hat, a visor, a top hat, a sailor's hat, a touring cap, a fishermen's hat, a Santa's hat, a Robin Hood's hat, a Maid Marion's hat, and a Sherlock Holmes' hat.

11. A method of securing a hat to an animal, the hat having an outer shell, an inner band secured to the outer shell, and a plurality of apertures extending through the inner band, the method comprising:

threading a strap through a first aperture and a second aperture to form a first loop;

threading the strap through a third aperture to form a second loop;

threading the strap through a fourth aperture to form a third loop;

positioning the second loop under a muzzle of the animal;

passing free ends of the strap behind the animal's ears; and securing the free ends together under the muzzle.

12. The method of claim 11, wherein:

the step of threading the strap through the first aperture and the second aperture to form the first loop includes the step of threading the strap through the first aperture, a ring, and the second aperture to form the first loop, and the step of threading the strap through the fourth aperture to form the third loop includes the step of threading the strap through the ring and the fourth aperture to form the third loop.

13. The method of claim 12, wherein the ring is formed from a resilient material.

14. The method of claim 11, further including the step of:

joining the first loop and the third loop together with a ring.

15. The method of claim 11, wherein the inner band is formed from interfacing material.

16. The method of claim 11, wherein the inner band is folded in half lengthwise to form a crease with first and second side walls extending from the crease.

17. The method of claim 16, wherein the plurality of apertures are defined as notches through the crease.

18. The method of claim 11, wherein the strap is formed from Grosgrain ribbon.

19. The method of claim 11, wherein the outer shell is in the shape of one of a baseball hat, a mortar board, a cowboy hat, a chef's hat, a tiara, a firemen's hat, a beach hat, a visor, a top hat, a sailor's hat, a touring cap, a fishermen's hat, a Santa's hat, a Robin Hood's hat, a Maid Marion's hat, and a Sherlock Holmes' hat.

* * * * *